Nov. 12, 1940.   D. M. WEIGEL   2,220,926
INTERNAL COMBUSTION ENGINE
Filed Feb. 8, 1936   5 Sheets—Sheet 1

Inventor
DANIEL M. WEIGEL
By Richey & Watts
Attorneys

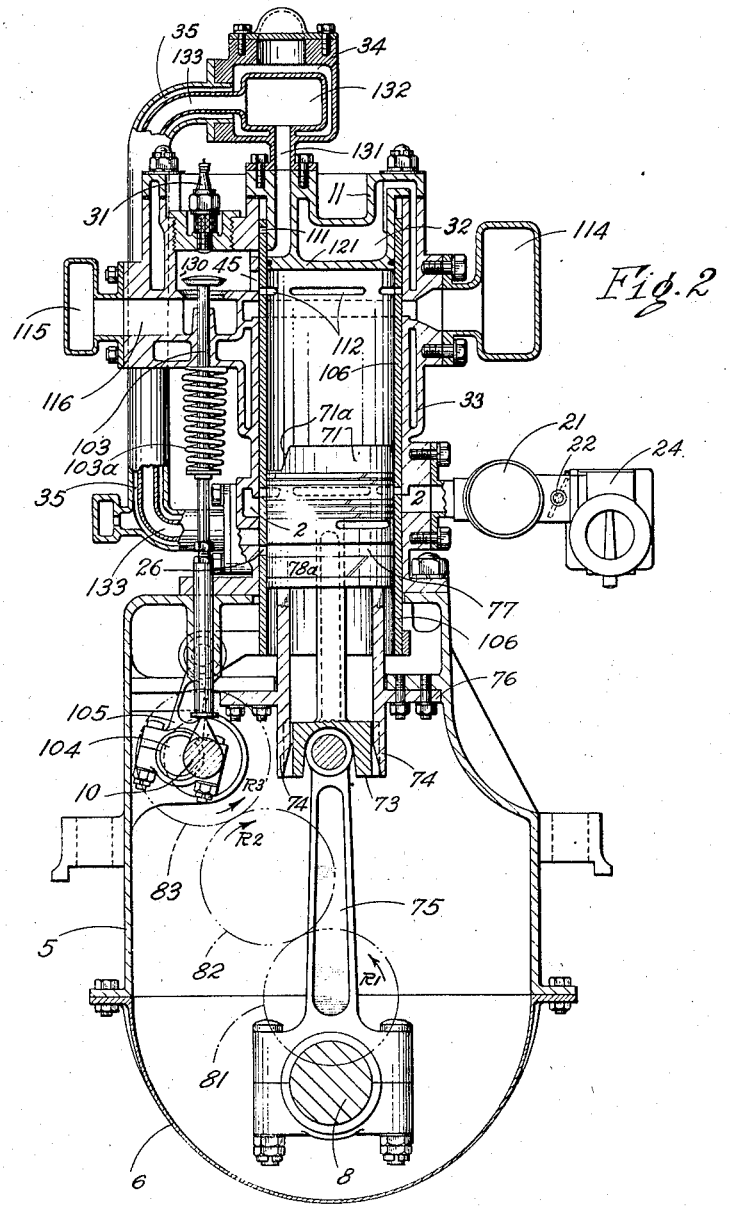

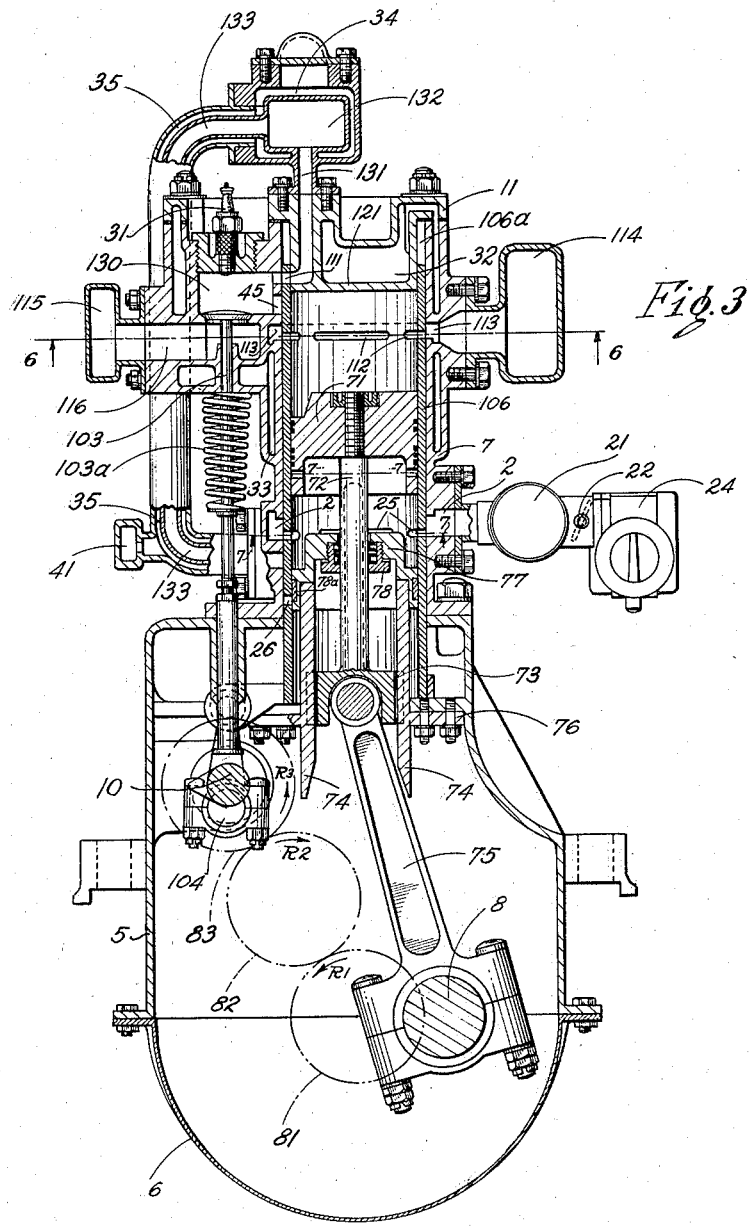

Nov. 12, 1940.　　　D. M. WEIGEL　　　2,220,926
INTERNAL COMBUSTION ENGINE
Filed Feb. 8, 1936　　　5 Sheets-Sheet 4
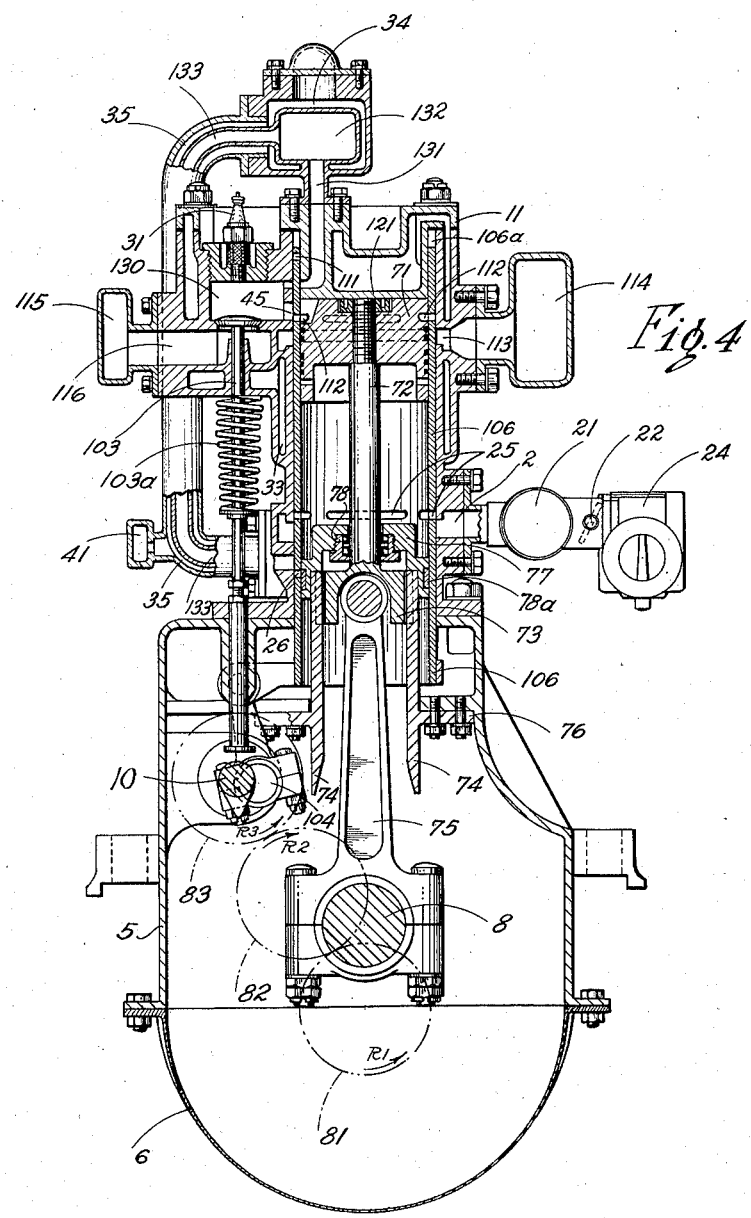
Inventor
DANIEL M. WEIGEL
Attorneys Nov. 12, 1940.  D. M. WEIGEL  2,220,926
INTERNAL COMBUSTION ENGINE
Filed Feb. 8, 1936  5 Sheets-Sheet 5
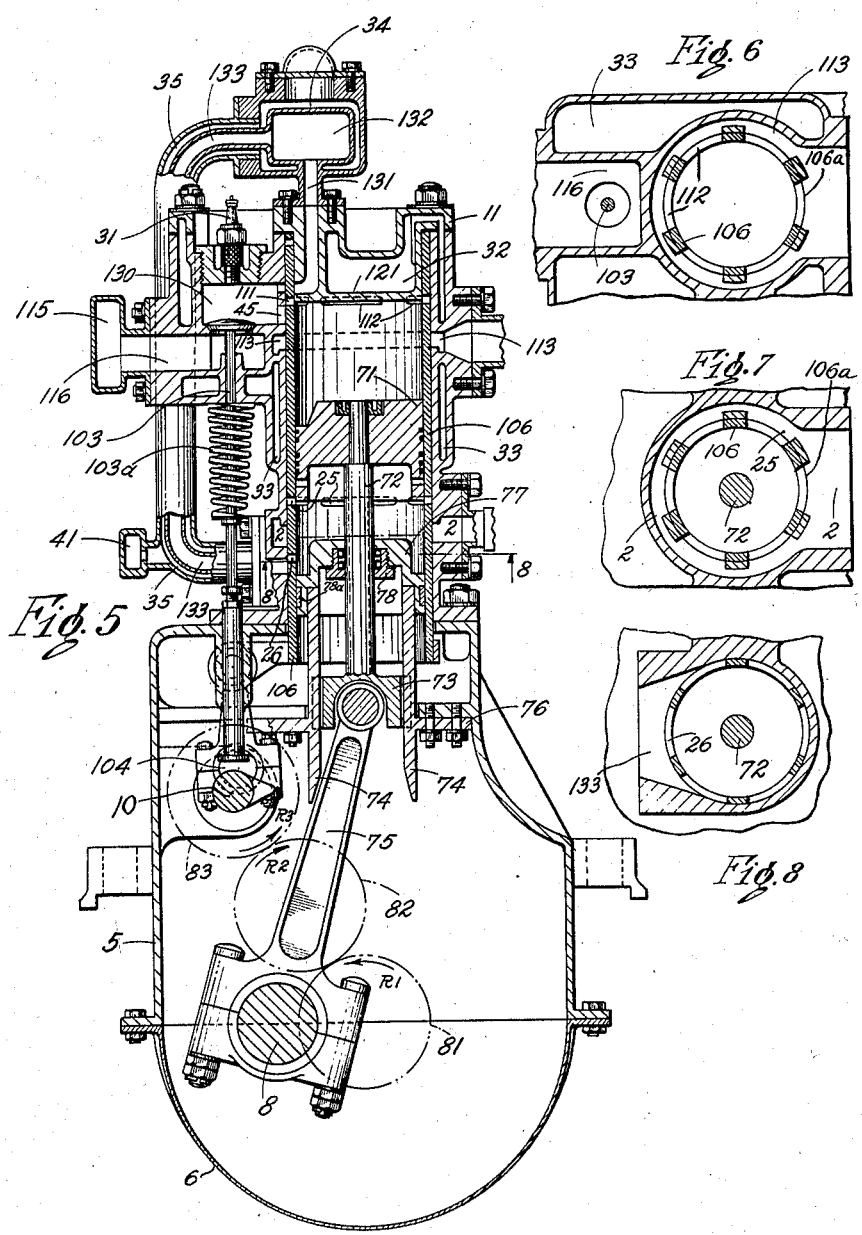
Inventor
DANIEL M. WEIGEL
By
Richey & Wells
Attorneys Patented Nov. 12, 1940

2,220,926

UNITED STATES PATENT OFFICE 2,220,926

INTERNAL COMBUSTION ENGINE

Daniel Michel Weigel, Cleveland, Ohio

Application February 8, 1936, Serial No. 62,903
In Canada August 4, 1930

35 Claims. (Cl. 60—44)

My invention relates to internal combustion engines and more particularly to an improved cycle and more efficient method and apparatus for obtaining energy from the fuel charges consumed by said engines. This application is a continuation in part of my copending application Serial No. 554,306, filed July 31, 1931, now abandoned.

Internal combustion engines constructed according to the Otto cycle, known as four cycle engines, present a number of advantages over other known types of internal combustion engines and have enjoyed wide commercial acceptance. Briefly, the Otto cycle involves the following operations in sequence during four consecutive strokes or each two revolutions of the flywheel: (a) the inspiration of a mixture of gas and air throughout one stroke; (b) compression during the second (return) stroke; (c) ignition at or near the dead point and resulting expansion during the third stroke; (d) expulsion of the burned gas during the fourth stroke (return). From this it will be understood that the Otto cycle requires two revolutions of the flywheel for each power or expansion stroke (c). Heretofore those skilled in the art have been unable to retain the Otto cycle and its attendant advantages without resorting to two revolutions of the flywheel. Two cycle single acting engines have been developed in which an explosion takes place with each revolution, but such engines are inefficient in that the strokes are not distinctly separated in their functions and that two cycle engine construction involves conducting fuel charges into a cylinder to assist in driving out burned gases through an exhaust port and that the compression stroke compresses quantities of burned as well as unburned gases. Other disadvantages associated with two cycle engines are appreciated by those skilled in this art and such disadvantages have had considerable bearing upon the commercial acceptance and use of the two cycle engine.

Recent developments in engines of the four cycle type have resulted in considerably increased compression ratios. By the use of certain materials and certain types of fuel automotive engineers have succeeded in successfully operating engines of the Otto cycle type with compression ratios as high as 7 to 1. It is generally appreciated that the initial pressure at the time of ignition; that is, the pressure of the gaseous fuel charges, should be as high as possible and thus various expedients have been resorted to to attain high compression ratios. The combustion chamber in any type of internal combustion engine of necessity becomes heated by repeated explosions during operation and in the conventional Otto cycle engines the gaseous fuel charge is compressed between the top of the piston and the heated combustion chamber thereabove. Efforts to increase the compression ratio appreciably above 7 to 1 have been impeded by the self-ignition and detonating characteristics of the fuel charge due to the heating occasioned by the compression and due to the heat imparted to the gaseous mix from the walls of the combustion chamber. In Diesel types of engines the self-ignition problem is avoided in that the compressed gas is substantially devoid of explosive constituents and the fuel charge is injected into the compressed gas at the time explosion is desired. The Diesel type of engine fails to provide a number of advantages relating to mixing of the fuel with the compressed gas found in the Otto cycle engines.

It is among the objects of my invention to provide an internal combustion engine which will carry out a cycle corresponding to the Otto cycle in one revolution of the crankshaft. It is a further object of my invention to provide an engine according to the preceding object which will develop a higher compression ratio than that attainable in an Otto cycle engine. It is a further object of my invention to provide an internal combustion engine according to the preceding objects in which the fuel charge expanded at said higher compression ratio is permitted to expand to a volume exceeding the volume of the charge prior to its initial compression. It is a further object of my invention to provide an internal combustion engine having a cycle corresponding to the Otto cycle, but distinguishing thereover in that inspired and compressed gaseous fuel charges are not consumed during the cycle next succeeding that which compresses said charges. It is a further object of my invention to provide an internal combustion engine and a method of conducting the fuel charges therethrough whereby inspired and compressed gases are cooled intermediate the compression of said charges and the expansion of same during the power stroke. It is a further object of my invention to provide an internal combustion engine according to the two preceding objects in which the inspired, compressed and cooled fuel charge consumed in each expansion stroke possesses a weight per unit volume of expanding charge which exceeds the weight per unit volume of expanding charge attainable in a conventional Otto cycle engine.

It is a further object of my invention to provide an internal combustion engine constructed according to the preceding objects in which an uneven number of cylinders aligned on one side of a crankshaft effect a balanced power out-put throughout each revolution of the crankshaft. It is a further object of my invention to provide an internal combustion engine constructed according to the foregoing objects in which an improved valve mechanism effects an efficient induction and separation of the burned and unburned fuel charges through the novel cycle referred to. It is a further object of my invention to provide a reserve volume of cooled and compressed gas at a given ratio of compression; and to charge the cylinder in preparation for the next ignition and expansion at the full compression ratio from such reserve. It is a further object to carry out the cycle of work in a single crankshaft revolution and a single volume of displacement. Another object of the invention is to maintain a constant clearance volume, or combustion chamber, so that the full force of expansion acts upon the working piston and no power is lost due to variations of the clearance volume.

Generally speaking, the objects and advantages of an internal combustion engine constructed according to my invention are attained by utilizing the displacement between one piston face and a cylinder for a power cylinder and the displacement between another piston face and a cylinder as a compression cylinder, preferably by means of a double acting piston in a single cylinder, and the arrangement of a constant volume combustion chamber which communicates and is separated from said power cylinder in timed relation to the piston movements. A by-pass is arranged to connect the compression cylinder and the combustion chamber to conduct fuel charges from said said compression cylinder to said chamber. Properly timed valve means place the cylinder in communication with a fuel supply and also place the combustion chamber in communication with the power cylinder or in communication with the by-pass at proper times in the cycle so that fuel charges may be successively compressed in the by-pass, conducted therefrom to the combustion chamber, expanded by way of the combustion chamber and the power cylinder and thereafter exhausted from the power cylinder and the combustion chamber. Preferably the fuel charges initially compressed are cooled in the by-pass on their way to the combustion chamber and thus the gaseous mixture conducted to the combustion chamber may attain a very high pressure without reaching the ignition temperature and contain a large quantity of combustible material in proportion to a unit of its volume.

Those familiar with internal combustion engines will readily appreciate the increased efficiency flowing from the increase in pressure and density of the fuel charge to be expanded. For instance in the calculations of the power for a gas engine it is quite conventional to state the formula, horse power equals means effective pressure times length of stroke times area of the piston times number of explosion strokes per minute divided by 33,000. It will be apparent that the increased pressure and the increased density of the charge raise the heating value and correspondingly raise the temperature after combustion and therefore the mean effective pressure during expansion. As will be understood as the description proceeds the number of power strokes per revolution of crankshaft and the increase in initial pressure provides an engine having a great many advantages in operating efficiency over internal combustion engines heretofore provided. Other objects and advantages relating to inertia losses, large port areas and economies of manufacture will appear from the following detailed description and the attached drawings wherein:

Figure 2 is a transverse view partly in section of the engine shown in Figure 1 with the piston at its lowest position within the cylinder;

Figure 3 is a transverse sectional view corresponding to Figure 2 and distinguishing therefrom in that the parts are in a position determined by 90° of crankshaft rotation;

Figure 4 is a transverse sectional view corresponding to Figure 2 and distinguishing therefrom in that parts are positioned as determined by 180° of crankshaft rotation;

Figure 5 is a transverse sectional view corresponding to Figure 2 and distinguishing thereover in that the parts are positioned as determined by 270° of crankshaft rotation;

Figure 6 is a sectional plan view looking along the line 6—6 of Figure 3;

Figure 7 is a sectional plan view looking substantially along the line 7—7 of Figure 3;

Figure 8 is a sectional plan view taken substantially along the line 8—8 of Figure 5.

Figure 1:
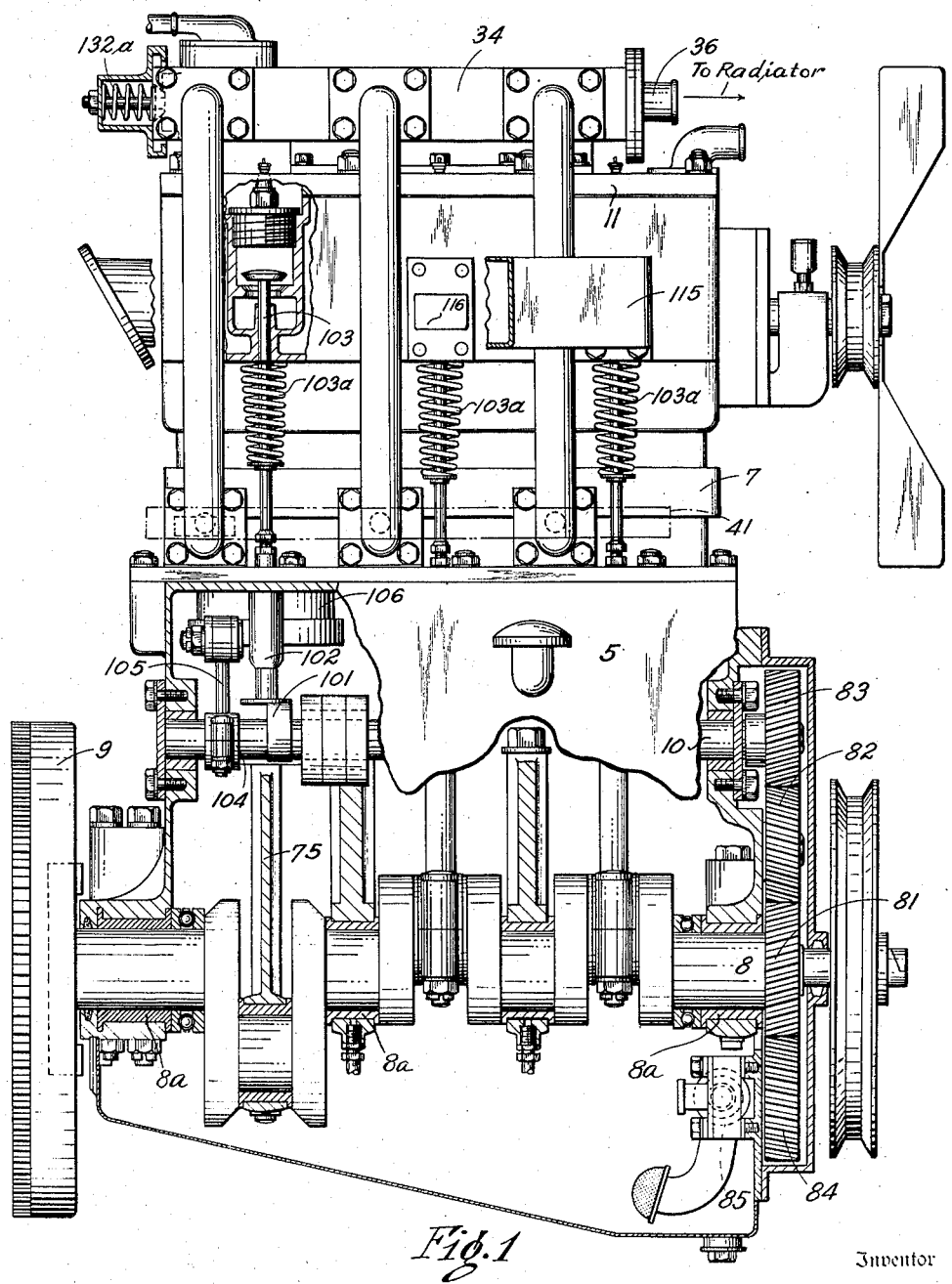
Figure 1 is an elevation with parts broken away of a three cylinder internal combustion engine constructed according to my invention.

In the preferred embodiment of my invention as illustrated in Figure 1 three cylinders are employed, although it will be understood from the following description of theory and operation that any number of cylinders may be employed or that the engine may efficiently be operated and constructed with only one cylinder. The unitary parts of the engine comprise a crank case composed of an upper half 5 and a lower half or pan 6 which supports thereabove an engine block 7 suitably bored and water jacketed to provide three cylindrical apertures 106a. A crankshaft 8 is supported intermediate the ends of the crank case 5—6 in suitable main bearings 8a and is provided at its rear end with the conventional flywheel 9. A cam shaft 10 is disposed above and at one side of the crankshaft 8 and is supported at its ends in suitable bearings formed in the crank case. Cams 101 are secured to the cam shaft 10 and are operatively disposed beneath valve tappets 102 arranged to actuate exhaust valves 103 in a manner more fully described hereinafter. The cam shaft is preferably offset as shown at 104 to provide eccentric crank portions arranged to actuate through connecting rods 105 a cylinder sleeve 106.

A timing gear 81 secured to the crankshaft 8 adjacent its forward end is arranged in geared relation with an idler timing gear 82 which in turn is in mesh with a timing gear 83 secured to the forward end of the cam shaft. Said series of intermeshed gears being provided with equal diameters effect a complete revolution of the cam shaft in response to each revolution of the crankshaft. Due to the interposition of the idle timing gear 82 the direction of rotation of the cam shaft and the crankshaft will be the same. Preferably an oil pump 85 is driven through gear 84 in mesh with the driving timing gear 81 and suitable oil line pipes (not shown) conduct the usual lubricant contained in the crank case to various moving parts of the engine in the conventional manner.

A double acting piston 11 is arranged to reciprocate within the cylinder sleeve 106 disposed in cylindrical block apertures 106a and is referred to as a double acting piston in that both sides of the piston are at work during all reciprocating movement. The piston 71 as illustrated is of the crosshead guided type in that the piston rod 72 secured thereto is restricted to straight reciprocating motion by a crosshead 73 slidably mounted in crosshead guides 74 secured to the crank case. A conventional type of connecting rod 75 is disposed intermediate and pivoted to the crosshead 73 and the crankshaft 8 to convert the reciprocating motion of the piston to rotary motion in the crankshaft. The crosshead guides are suitably secured to and supported by the upper portion of the crank case through brackets as at 76 and the upper ends of the crosshead guides support an annular cylinder head 77 proportioned to fit within the cylinder sleeve 106. The cylinder head 77 which for convenience may be referred to as the lower cylinder head is preferably provided with sealing means as at 78, 78a to prevent the escape of gases between the periphery of the cylinder head and the cylinder sleeve or between the piston rod 72 and the centrally formed aperture in the lower cylinder head 77.

A cylinder head indicated generally at 11 is provided with a circular cylinder closing portion 121 proportioned to fit within the cylinder sleeve 106. At one side of the cylinder and piston assembly and adjacent the upper end thereof the cylinder block 7 is formed with a combustion chamber 130 which through suitable ports in the cylinder sleeve 106 may communicate with a fuel charge passage 131 which leads to a longitudinally arranged compression chamber 132. A fuel charge by-pass 133 extends laterally from said compression chamber and is thence directed downwardly and returned laterally toward the cylinder adjacent the lower cylinder head 77. By means of other suitably formed ports in said reciprocating cylinder sleeve the by-pass 133 may be arranged to communicate with the lower end of the cylinder.

An intake duct 2 is formed in the lower end of the cylinder block and is given a substantially annular shape to circumferentially surround the cylinder sleeve (see Figure 7). One side of the intake duct 2 communicates directly with an intake manifold 21 which through butterfly valve 22 receives fuel charges from the carburetor 24. By means of circumferential ports 25 cut in the sleeve 106 the manifold 21 and intake duct 2 may be placed in communication with the lower end of the cylinder and when this occurs it will be observed that upward movement of the piston 71 will draw a fuel charge through the ports 25 into the space between the piston 71 and the lower head 77. This function may be referred to as the inspiration or intake of a fuel charge and is best illustrated in Figure 3.

The upper end of the cylinder sleeve may be provided with a port as at 111 adapted to be aligned with an opening in the wall of the combustion chamber 130 and fuel charge inlet passage 131. Additional ports 112 are circumferentially cut through the cylinder sleeve 106 and are adapted upon suitable movement of the piston and sleeve to align said ports 112 with an exhaust duct 113. The exhaust duct is formed (see Figure 6) to have a contour similar to the intake chamber whereby exhaust gases may be quickly forced through the large area passages 112 through the duct 113 to exhaust manifold 114. A secondary exhaust manifold as at 115 is arranged on the opposite side of the engine and passageway 116 leading therefrom is in communication with a duct formed beneath the combustion chamber exhaust valve 103.

In that embodiment of my invention herein illustrated and described I prefer to employ an electric spark to ignite the fuel charges and to effect such ignition suitable wires and sources of electrical energy (not shown) are connected to a spark plug as at 31 positioned in the combustion chamber 130. The particular ignition means forms no essential part of my invention and it will be understood by those skilled in this art that various types of ignition means and ignition timing devices may be co-ordinated with moving parts of the engine to ignite a fuel charge in the combustion chamber 130 at the time desired.

The cylinder sleeve 106 is reciprocated in timed relation to crankshaft movements by connecting rod 105 within the aperture 106a formed in the block 7. To transfer and dissipate a portion of the heat developed through operation of the engine, the cylinder head and block are provided with suitable water jackets as at 32 and 33, respectively, said jackets being connected through suitable pumps to a radiator in the usual manner.

A second cooling system and one which is associated with certain novel characteristics of my engine comprises the water jackets 34 and 35 which surround the compression chamber 132 and the by-pass 133 leading from said chamber to the lower end of the cylinder. Preferably the cooling medium which may be water or other more efficient liquid is taken into said second cooling system through the manifold 41 and communicates therethrough with each of the cooling jackets 35 surrounding the by-pass 133. As the medium is heated in the by-pass due to causes more fully described hereinafter the cooling medium will move upwardly into the cooling jacket 34 and is conducted therefrom through pipe 36 to a suitable radiator or other fluid cooling device, which may be the same radiator for the cylinder cooling system or a separate one.

A general definition of the functions effected by the above described apparatus and the co-ordination of movements includes an opening of the passages intermediate the intake manifold 21 and the space between the lower cylinder head and the piston as the piston moves upwardly, thus inspiring a fuel charge comprising air and gasoline or other fuel beneath the piston. Inspection of Figures 2 and 3 illustrates the action referred to. Upon completion of the upward movement of the piston the fuel charge inspired therebeneath completely fills the space between the underside of the piston and the lower cylinder head 77. Upon the downward motion of the piston the sleeve moves so as to close and prevent escape of the inspired gases back into the manifold. Said inspired fuel charge is thereafter forced through the port 26 in the sleeve into the by-pass 133.

In the absence of any means to relieve the pressure in the by-pass 133 and the compression chamber 132, it will be understood that successive inspiration and compression movements of the piston would raise the pressure of the fuel charge in the by-pass and its associated compression chamber. The cylinder sleeve is adapted in its reiprocation to place the by-pass and combustion chamber in communication with each other and this function is co-ordinated with the piston movements so that the compressed fuel charges are fed into the combustion chamber and later exploded at about the time the piston reaches its maximum upward position. The cylinder sleeve is also arranged to permit the escape of the exhaust gas subsequent to each firing or expansion stroke and thus I have provided an arrangement whereby each upward stroke of the piston inspires a fuel charge beneath the piston and simultaneously forces burned gases out from the upper side of the piston. And also during such stroke the combustion chamber is charged with fresh gas from the compression chamber. The same arrangement provides that a previously inspired fuel charge is compressed beneath the piston as the piston moves downwardly on its expansion or power stroke.

More specifially the operation of an engine according to my invention involves the movements of parts as illustrated in Figures 2 to 5 inclusive. As the crankshaft is rotated in the direction of arrow R—1 through the first 90° of crank rotation the piston is moved upwardly from its lowermost position indicated in Figure 2. For the purpose of illustration it will be assumed that this is the initial rotation of the crankshaft and that there are no fuel charges or burned gases anywhere in the system. As the piston moves upwardly the cam shaft rotation, indicated by R—3 moves the crank 104 downwardly and thus moves the cylinder sleeve 106 downwardly. The immediate effect of this movement with respect to the intake chamber 2 is to place the intake chamber in communication with the space beneath the piston through the ports 25. A fuel charge is thereupon induced beneath the piston and this induction of fuel charge continues as long as the piston is moved upwardly and the sleeve ports 25 permits passage of the gaseous mixture from the intake. According to the condition assumed there is no explosion or expansion stroke present to force the piston downwardly from its position as indicated in Figure 4. During the movement of the piston from its position in Figure 3 to the position of Figure 4 the cam shaft has turned through another quadrant and has thus moved the ports 25 out of alignment with the intake chamber 2. Thus far the function of the piston and its associated parts corresponds to the first phase of the conventional Otto cycle; that is, a volume of gaseous mixture has been induced within the cylinder chamber which corresponds to a cylinder chamber having a volume determined by the bore and stroke of the engine.

The next phase of movement in my engine is initiated by the downward movement of the piston from the position shown in Figure 4. The gases inspired beneath the piston are thereupon compressed between the piston 71 and the lower cylinder head 77. As the piston starts downwardly the sleeve is moving at its maximum speed as determined by the offset of crank 104 and is rapidly moving the sleeve port 26 upwardly into alignment with the lower end of the by-pass 133. As the port 26 reaches alignment with the by-pass the gaseous fuel charge compressed beneath the piston is forced out into the by-pass. The completion of the downward movement of the piston restores the parts to the position as shown in Figure 2 wherein the port 26 has again moved out of alignment with the lower by-pass 133.

In tracing through the second complete revolution it will be observed that a gaseous fuel charge under pressure is present in the compression chamber 132 and in the by-pass 133 and thus fuel is available for conduction into the combustion chamber with a resulting available power stroke. Referring again to Figures 2 and 3 continued movement of the cam shaft 10 through 90° will move the sleeve port 111 into alignment with the passageway 131 and the combustion chamber 130 with the result that the compressed gaseous fuel charge will occupy the by-pass, the compression chamber and the combustion chamber 130. That volume of the fuel charge which will flow into combustion chamber 130 however is but a relatively small part of the total volume of fuel charge. Continued upward movement of the piston brings about a movement of the sleeve 106 which eventually closes the combustion chamber with respect to the compression chamber 132 and as the piston approaches or attains its maximum upward movement the charge in the combustion chamber is fired by means of the spark plug 31. The same upward movement of the sleeve 106 which effected a closing of the combustion chamber with respect to the compression chamber prior to ignition effected an alignment of the ports 112 with a combustion chamber port 45 and thus the expansion of the burning gas flows through said aligned ports 45—112 and through the continued expansion of said burning gases forces the piston 71 downwardly. As indicated the piston 71 is cut away as at 71a to facilitate the movement of the burning gases with respect to the ports and piston.

As will be understood from prior description a second inspiration of gaseous fuel charge beneath the piston necessarily preceded the expansion or power stroke described in the preceding paragraph. As the piston moves downwardly on the power stroke the inspired gases will be forced through port 26 into the by-pass 133. However, the by-pass 133 already contains a portion of the first inspired fuel charge under a pressure determined by the relation of the volumes of the cylinder and the parts associated with the by-pass. The second inspiration and compression of a gaseous fuel charge beneath the piston therefore results in a compression of a combustible gaseous mixture in the by-pass and compression chamber which exceeds in weight the fuel charge initially inspired. The increase in weight of the gas contained within the by-pass and compression chamber subsequent to the second downward movement of the piston is necessary by reason of the fact that the compression chamber 132 and by-pass 133 contained a considerable portion of the first inspired gaseous fuel charge at the time that the second inspired gaseous fuel charge was started into the by-pass. For convenience I will refer to the volume of gas which may be inspired beneath the piston by an upward movement of the same as a "cylinderful." Thus it will be observed that subsequent to the second inspiration and compression of gaseous fuel, the by-pass and its associated compression chamber will contain more than one "cylinderful" of fuel. The volume, however, in the by-pass and associated compression chamber 132 may be less than that first occupied by a cylinderful upon inspiration or may be greater, depending upon the amount of time desired in the particular engine for cooling, vaporizing and mixing the compressed mixture.

Continued rotation of the crankshaft will bring about a second conduction of gaseous fuel charge from the compression chamber 132 into the combustion chamber 130 and will bring about the firing of said second charge and a second power stroke. It will be noted, however, that said second induction of a fuel charge into the combustion chamber occasioned by the proper position of port 111 introduces a quantity of mixture under a much higher pressure than the pressure of the first charge fired in the combustion chamber. In other words, the pressure of the mixture within the combustion chamber at the time of the second firing is a pressure resulting from having more than one "cylinderful" of gas moved into the by-pass and compression chamber. The movement of the second fuel charge or mixture into the combustion chamber merely withdraws from the total volume in the by-pass and compression chamber a volume corresponding to the volume of the combustion chamber. This will reduce the pressure somewhat in the combustion chamber and associated by-pass and will withdraw by weight a quantity of the fuel contained therein. The pressure in the compression chamber and the by-pass will, however, exceed the pressure existing therein after the first induction of a fuel charge into the combustion chamber.

As the piston moves downwardly in response to the firing of said second fuel charge in the combustion chamber a third "cylinderful" of inspired gas will be forced into the by-pass and compression chamber in a manner heretofore described. Said third and succeeding inspirations and compressions further raise the pressure in the by-pass. This results in the conduction of gas at a higher pressure into the combustion chamber for firing on each successive revolution of the crankshaft. The increase in pressure in the by-pass continues until one "cylinderful" of gas is conducted into the combustion chamber for each firing or expansion stroke, or, in other words, the normal relationship is reached so that one cylinder full of inspired gas equals one combustion chamber full of compressed gas, the volume of the cylinder and chamber being constant and fixed. The crankshaft revolutions required to build up the by-pass and compression chamber pressure to the point where one "cylinderful" will be fed into the combustion chamber for each expansion stroke will be determined by the relation between the volume of the by-pass plus its associated parts and a "cylinderful" of gas. If the by-pass, the compression chamber, and the passageway 131 leading from the compression chamber to the combustion chamber are large it will require a relatively large number of revolutions of the crankshaft to effect a compression chamber pressure whereby a "cylinderful" of compressed gas is forced into the combustion chamber 130 each time the port 111 opens itno the combustion chamber. On the other hand if the volume of the by-pass, compression chamber 132, and passageway 131 is small a relatively small number of crankshaft revolutions will be necessary to raise the compression chamber pressure to the point where one "cylinderful" of gas is forced into the combustion chamber for each firing stroke. The maximum pressure attained at any throttle valve opening is the pressure of the inspired gas multiplied by the ratio between the displacement volume of the cylinder on the compression side and the volume of the combustion chamber.

Thus far the detailed description of the operation has dealt mainly with the successive inspiration and compression of the gas available for the firing or expansion stroke. By reference to Figure 4 it will be observed that the port 112 has reached its lowermost position with respect to the combustion chamber port 45 and continued rotation of the cam shaft moves the cylinder sleeve 106 upwardly so that the extended axial dimensions of port 45 permits the cylinder and combustion chamber to be in communication substantially throughout the firing stroke. By virtue of this arrangement one cylinderful of gaseous mixture is burned and the burned gases expand to a volume greater than one "cylinderful" since there is no piston rod above the piston and since the cylinder and combustion chamber are in communication. This phase of the operation of my engine corresponds to the conventional Otto cycle in that the combustion chamber and the cylinder are in communication with each other during the power stroke and thus permit the full expansion of one "cylinderful" of gaseous mixture.

To exhaust the burned gases from the cylinder and the combustion chamber I prefer to employ two exhaust valve means, namely a poppet valve 103 and a sleeve valve, said means suited to independent timing. The preferred timing of the valves is illustrated in the drawings and the positions of the valves at 90° intervals throughout one complete revolution are illustrated by Figures 2 to 5 inclusive. In the embodiment shown in the drawings the crank pin 8 for each cylinder leads the exhaust cam 101 for that cylinder by substantially 180° or in other words the exhaust valve 103 is fully opened when the piston reaches its outer dead center. The crank 104 for each cylinder leads the exhaust cam 101 for that cylinder preferably a little less than 90°. Referring to Figure 3 it will be observed that the ports 112 in the sleeve 106 have been moved into alignment with the exhaust chamber 113 and thus burned gases are being forced out of the cylinder above the piston 71 by the scavenging action of said piston. By reference to Figures 5 and 2 it will be seen that, with the arrangement shown, the combustion chamber 130 is open to the power cylinder through the ports 112 when the poppet valve 103 begins to open at a point between the positions of the parts shown in Figure 5 and in Figure 2. The location of the point at which the poppet valve begins to open is determined in the same manner as in conventional four stroke cycle engines in accordance with the design of the particular engine so that the pressure in the power cylinder may be reduced in sufficient time to avoid excessive back pressure on the piston at the beginning of the next inward stroke. As the exhaust stroke of the piston continues from the position shown in Figure 2 the ports 112 move rapidly out of alignment with the port 45 and into alignment with the exhaust duct 113 and the poppet valve 103 begins to close. At this time the combustion chamber 130 contains inert gases at substantially atmospheric pressure, or less, and is no longer in communication with the power cylinder. The inert gases in the power cylinder are scavenged by the inward movement of the piston into the exhaust duct 113 which remains open to the power cylinder through the ports 112 throughout substantially the entire inward stroke. Between the positions of the parts shown in Figures 2 and 3 and after the ports 112 have cut off the communication between the combustion chamber 130 and the power cylinder, the port 111 opens to admit a fresh charge of compressed gas into the combustion chamber. Preferably the port 111 opens after the poppet valve 103 closes, but if desired it may open just before the poppet valve closes so that the inert gases remaining in the combustion chamber 130 may be at least partially blown out through the poppet valve by the incoming fresh charge. The exact relationship between the closing of the poppet valve 130 and the opening of the port 111 may be varied as desired by a variation in the relative positions of the cams 101 and the crank pins 104 on the cam shaft 10, or by varying the position of the lower edge of the port 111 in the sleeve. Similarly the point at which the poppet valve 103 opens and the length of time which it remains open may be varied by varying the shape of the cam or the relative position of the cam and the main crank pin 8. Obviously, the relative timing between the poppet valve 103 and the opening of the ports 112 into the exhaust duct 113 may also be varied to obtain any exhaust action desired. The valve timing illustrated and described insures that a fuel charge corresponding to a "cylinderful" of inspired gas will be contained in the combustion chamber and available for a power stroke when the piston has reached the proper position in the cylinder for the ignition of the charge. Springs 103a may be employed to return the poppet valve to its closed position in the conventional manner.

Omitting the details of the heretofore described method of developing the high pressures in the bypass and compression chamber and reviewing the operation of the engine subsequent to an attainment of high by-pass pressures, it will be noted that a cylinderful of gas is forced into the by-pass 133 upon each downward movement of the piston. (The pressure in the by-pass subsequent to the attainment of the full operating pressure heretofore described will be very high and in proportion to the relation between the combustion chamber and the volume of the inspired gas. For instance, the ratio of the volume of the combustion chamber 130 with respect to the displacement volume of the cylinder on the compression side (which is calculated with a subtraction of the volume of the piston rod 72) may be as high as 15 to 1. This ratio will be the effective compression ratio of the engine and may far exceed any ratio attainable with the conventional Otto cycle engine burning an inspired and adiabatically compressed gaseous mixture due to the self-ignition difficulties heretofore pointed out.

According to my invention the compression of the gas takes place at that end of the cylinder remote from the firing or combustion chamber end of the cylinder and thus is relatively cool. Some heat, however, will be transmitted through the head of the piston and through the various parts of the engine to the lower end of the cylinder and this heat naturally limits the characteristics of the fuel charge which may be inspired. The fuel charge drawn in from the manifold tends to expand upon contact with the heated walls of the cylinder beneath the piston and the gaseous charge will cease to flow in as soon as the pressure within the cylinder equals the pressure in the manifold which in turn is determined by atmosphere. In any event the cylinder walls beneath the piston will be cooler than the top of a cylinder joined to a combustion chamber as in the conventional Otto cycle engine and this characteristic of my invention brings about the induction of a greater weight of gaseous mix than possible with said conventional types of engines.

As the port 26 reaches alignment with the by-pass opening so that the inspired gaseous mix may be forced into the by-pass the three interconnected volumes, namely, the compression chamber 132, the by-pass 133 and the space beneath the cylinder attain the same pressure. A flow of highly compressed gas out of the lower end of the by-pass into the space beneath the cylinder effects a cooling of that portion of the gas which remains in the by-pass and the compression chamber (Joule-Thomson effect). As the piston moves down and the gas therebeneath is forced into the by-pass the temperature of all of the gas in said interconnected volumes is raised due to the compression, the highest temperature occurring at the instant of highest pressure or as the piston approaches lower dead center. The by-pass, however, being jacketed by a cooling medium rapidly transfers heat occasioned by compression to the cooling medium. The downward movement of the piston which forces all of the gas back into the by-pass of the compression chamber, being rapid, is a substantially adiabatic compression. However, the rise in temperature due to adiabatic compression is a function of the compression ratio which in turn is the initial volume divided by the final volume. The compression ratio on the compression stroke is, therefore equal to the volume of the by-pass and compression chamber plus the displacement volume of the compression cylinder divided by the volume of the by-pass and compression chamber. The rise in temperature during the compression stroke of the piston is therefore relatively small, the heat generated being distributed uniformly throughout the body of gas in the compression chamber and by-pass. The fresh charge in the cylinder is initially compressed isothermally by the compressed gas flowing into the cylinder from the by-pass, since the heat of compression which would normally be developed in compressing the charge to this resultant pressure is more than counteracted by the cooling from the expansion of the previously compressed gas, the net result at the beginning of the compression stroke being a temperature in the cylinder substantially lower than the temperature existing before the valve between the cylinder and the by-pass is opened. The heat of compression imparted to the entire body of gas is removed, at least in large part, by the water jacket about the by-pass and compression chamber, and this heat transfer is greatly facilitated by the agitation and movement of the gas which occurs upon the re-expansion of the compressed gas into the fresh charge in the compression cylinder and the recompression and consequent movement of the entire body of gas in the by-pass and compression chamber. This movement and agitation of the gas further assists in the mixing of the fuel and air, greatly improving the quality of the mixture before it reaches the combustion chamber. From the foregoing it will be understood that the pressures in the by-pass and hence the pressure of the fuel charge conducted to the combustion chamber brings about a compression ratio in my engine which far exceeds the ratios existing or attainable in an operative Otto cycle engine. The phenomenon of self-ignition is avoided by the low temperatures maintained during the compression by the removal of the heat due to compression and by preventing the mixture from reaching the ignition temperature at any time.

In the illustrated embodiment the by-pass 133 provided for each of the cylinders leads to a common compression chamber 132 and since there is a compression of inspired gas in each cylinder for each revolution of the crankshaft it will be understood that in the three cylinder engine shown three "cylindersful" of inspired gas are forced into the common compression chamber during each revolution of the crankshaft. In a like manner three power strokes are applied to the crankshaft during each revolution thereof and thus there is a power stroke for each 120° of crankshaft rotation. The common compression chamber 132 may be provided with a safety valve 132a to eliminate the danger of an improper ignition of gases in the container.

The intake manifold 21, the cylinder exhaust manifold 114 and the combustion chamber exhaust manifold 115 are preferably arranged to communicate with all of the cylinders in the conventional manner. It will be appreciated from an understanding of the detailed operation in connection with one of the three cylinders that at the time a fuel charge is being conducted into the combustion chamber in one cylinder a "cylinderful" of inspired gas is being simultaneously forced into the common compression chamber by another of said three cylinders. Thus in a multiple cylinder engine there is no appreciable fluctuation of pressure while the fuel charge is being fed into the combustion chamber. Since the gas induced or inspired in one cycle is not used in said same cycle, but is stored, agitated, expanded and recompressed, a dryer, better-conditioned gaseous charge is fed into the combustion chamber for firing. The ports being formed circumferentially in the cylinder sleeve and the arrangement of the intake, exhaust and by-pass chambers with respect to said ports permits the maintenance of an unusually large port area. This characteristic facilitates the efficient induction and movement of gases therethrough at very high engine speeds.

In addition, in the preferred embodiment of my invention, as disclosed, in which the intake ports and the cylinder exhaust ports are controlled by the single sleeve valve 106, the ports are changed with much greater rapidity than has heretofore been possible with any type of valving. As seen in Figure 2 the intake port in the compression end of the cylinder is just ready to open. At this point the crank pin 104 which reciprocates the sleeve valve 106 is on its downward stroke about midway between its dead centers and is therefore moving at substantially its maximum speed. The complete opening of the intake port is therefore effected in a very few degrees of crankshaft rotation at the time when the piston is just starting upwardly from its bottom dead center and is therefore moving at its slowest rate of speed. This same motion of the sleeve valve from the position shown in Figure 2 effects a rapid complete opening of the ports 112 into the exhaust duct 113. As the piston approaches its upper dead center the crank pin 104 is approaching the mid point between its dead centers on its upward movement and therefore effects a rapid change of the ports 112 from alignment with the exhaust duct 113 into alignment with the port 45 to open the combustion chamber to the power cylinder just after passing the position shown in Figure 4. The continued rapid movement of the sleeve opens the port 26 to the by-pass 133. The large intake and exhaust port areas and the rapid opening and closing of these ports greatly increases the efficiency of the engine and eliminates "wire drawing" of the gas and back pressure from the exhaust.

Although I have illustrated and described an apparatus and method of carrying out my invention in considerable detail, it will be understood that numerous variations and modifications may be effected by those skilled in the art without departing from the scope of the invention as defined by the appended claims.

I claim:

1. An internal combustion engine including a cylinder and piston to effect an intake stroke, a compression stroke, a power stroke and an exhaust stroke upon a single revolution of the crankshaft, said intake and compression stroke effected by one side of the piston at one end of the cylinder and the power and exhaust stroke effected by the other side of said piston at the other end of said cylinder, a by-pass and a constant volume combustion chamber arranged in series intermediate said ends of the cylinder, a valve connected to be operated in timed relation to the movement of said piston arranged to open said combustion chamber to said one end of the cylinder during each stroke of said piston in one direction and to close said combustion chamber from said cylinder during each stroke of said piston in the opposite direction, a valve arranged to open said one end of the cylinder to the atmosphere during each stroke of the piston in said opposite direction, a valve connected to be operated in timed relation to the movement of said piston arranged to open said combustion chamber to said by-pass once during each cycle of the movement of said piston and to close said combustion chamber from said by-pass during the remainder of each cycle, and valve means to control communication between said by-pass and said other end of the cylinder and between said other end of the cylinder and a supply of combustible mixture.

2. An internal combustion engine including a cylinder and double acting piston to effect an intake stroke, a compression stroke, a power stroke and an exhaust stroke upon a single revolution of the crankshaft, said intake and compression stroke effected at one end of said cylinder by one side of the piston and the power and exhaust stroke effected at the other end of said cylinder by the other side of said piston, a by-pass and a constant volume combustion chamber arranged in series intermediate the said two ends of the cylinder, valve means moving in response to piston movements to open said chamber into said cylinder at said other side of the piston during each power stroke and thereafter close said chamber to said cylinder, valve means to open said chamber to the atmosphere for exhaust, and thereafter close the chamber to atmosphere, and means to open said chamber to said by-pass for a recharge of fuel and close said chamber to said by-pass prior to the opening of the same into said cylinder.

3. An internal combustion engine comprising a cylinder having a double acting piston, one end of the cylinder having power and exhaust functions and the other end having inspiration and compression functions, a fixed volume combustion chamber arranged to communicate with or be separated from said one end of said cylinder in timed relation to the piston movements therein, a by-pass connecting said other end of said cylinder and said combustion chamber to conduct compressed fuel charges from said cylinder to said chamber, valve controlled fuel inlet means communicating with said other end of the cylinder, said chamber and cylinder provided with valve means moved in timed relation with respect to piston movements to place the combustion chamber in communication with said one end of the cylinder so that both chamber and cylinder are in communication and are completely filled with expanding gases during the power stroke and said chamber is subsequently exhausted to atmosphere, said chamber again filled with a fuel charge from said by-pass and again placed in communication with said power cylinder at the end of the exhaust stroke of said piston.

4. An internal combustion engine comprising a cylinder having a double acting piston, one end of the cylinder having power and exhaust functions and the other end having inspiration and compression functions, a fixed volume combustion chamber arranged to communicate with or be separated from said one end of said cylinder in timed relation to the piston movements therein, a by-pass connecting said other end of said cylinder and said combustion chamber to conduct compressed fuel charges from said cylinder to said chamber, valve controlled fuel inlet means communicating with said other end of the cylinder, ignition means to fire a fuel charge in said chamber, said chamber and cylinder provided with valve means moved in timed relation with respect to piston movements to place the combustion chamber in communication with said one end of the cylinder subsequent to ignition so that both chamber and cylinder are in communication with each other and are completely filled with expanding gases at the completion of the stroke and said chamber and power cylinder are subsequently exhausted to atmosphere, the chamber again filled with a fuel charge from said by-pass and again placed in communication with said cylinder at the end of the exhaust stroke of said piston.

5. An internal combustion engine comprising a power cylinder having a piston, a compression cylinder having a piston, a fixed volume combustion chamber arranged to communicate with or be separated from said power cylinder in timed relation to the piston movements therein, a fixed volume by-pass connecting said compression cylinder and combustion chamber to conduct fuel charges from said compression cylinder to said chamber, means to cool said by-pass to transfer heat therefrom occasioned by compression of gas therein, said chamber and cylinders provided with valve means moving in timed relation with piston movements to place the combustion chamber in communication with said power cylinder to effect a power stroke and to subsequently exhaust said chamber to the atmosphere, refill said chamber with a cooled compressed fuel charge from the by-pass, exhaust said power cylinder to atmosphere, and thereafter again place said chamber in communication with said power cylinder at the end of the exhaust stroke of said cylinder.

6. A multiple cylinder internal combustion engine including a cylinder and piston having only power and exhaust functions, a cylinder and piston having only inspiration and compression functions, a fixed volume combustion chamber arranged to communicate with or be separated from said power-exhaust cylinder in timed relation to the piston movements therein, a by-pass connecting said inspiration-compression cylinder and combustion chamber to conduct fuel charges from said inspiration-compression cylinder to said chamber, means to cool said by-pass to transfer heat therefrom occasioned by fuel charges forced therein, said chamber and cylinders provided with valve means moving in timed relation with piston movements to place the combustion chamber in communication with said power-exhaust cylinder to effect a power stroke and to subsequently exhaust said chamber and said power-exhaust cylinder to the atmosphere, said means operating to again fill said chamber with an inspired, compressed and cooled fuel charge from the by-pass.

7. An internal combustion engine including a cylinder having both ends closed and a double acting piston wherein each cylinder and piston effects an intake stroke, a compression stroke, a power stroke and an exhaust stroke upon a single revolution of the crankshaft, said intake and compression stroke effected by one side of said piston and the power and exhaust stroke effected by the other side of said piston, a fuel charge by-pass and a combustion chamber arranged in series intermediate the ends of the cylinder, means to transfer heat from fuel charges in said by-pass, means to open said chamber into said cylinder at said other side of said piston during the power stroke and thereafter in sequence open said chamber to the atmosphere, close said chamber to said cylinder, open said other side of said cylinder to exhaust same, open said chamber to said by-pass for a recharge of fuel, and again open said chamber into said cylinder at said other side of piston as said piston reaches the end of the exhaust stroke.

8. A multiple cylinder internal combustion engine including a plurality of cylinders and double acting pistons wherein each cylinder and piston effects an intake stroke, a compression stroke, a power stroke and an exhaust stroke upon a single revolution of the crankshaft, said intake and compression stroke effected between one side of said piston and one end of the cylinder and the power and exhaust stroke effected by the other side of said piston and the other end of said cylinder, a fuel charge by-pass and a combustion chamber arranged in series intermediate the ends of each of the cylinders, a compression chamber connecting said by-passes, means to transfer heat of compression from the fuel in said by-pass and compression chamber, means for each of said cylinders to open said combustion chamber into said cylinder at said other side of said piston during the power stroke and thereafter in sequence open said combustion chamber to the atmosphere, close said combustion chamber to said cylinder, open said other side of said cylinder to exhaust same, close said cylinder exhaust, open said combustion chamber to said compression chamber for a recharge of fuel, again open said combustion chamber into said cylinder as said piston reaches the end of the exhaust stroke, open said one end of said cylinder to said by-pass to force a fuel charge therein during the power stroke.

9. In an internal combustion engine, a power cylinder and a compression cylinder, said compression cylinder having a displacement no greater than that of the power cylinder, a fuel charge by-pass and combustion chamber arranged in series between the compression cylinder and the power cylinder to conduct successive fuel charges from the compression cylinder to the power cylinder, valve means intermediate the cylinders and chamber to open the combustion chamber to the power cylinder during each power stroke, to open the by-pass to the compression cylinder during each compression stroke, to close said by-pass to the compression cylinder during each exhaust stroke and to close said combustion chamber with respect to the power cylinder through the major portion of each exhaust stroke and to open said by-pass into the combustion chamber prior to the initiation of the power stroke.

10. In an internal combustion engine, a power cylinder and a compression cylinder, said compression cylinder having a displacement no greater than that of the power cylinder, a fixed volume fuel charge by-pass and a fixed volume combustion chamber arranged in series between the compression cylinder and the power cylinder to conduct successive fuel charges from the compression cylinder to the power cylinder, valve means to open the combustion chamber to the power cylinder during the power stroke, to open the by-pass to the compression cylinder during the compression stroke, to close said by-pass to the compression cylinder during the exhaust stroke and to close said combustion chamber with respect to the power cylinder through the major portion of the exhaust stroke, a second valve means operative to open said combustion chamber to the atmosphere during a portion of the exhaust stroke and close said chamber to the atmosphere prior to completion of the exhaust stroke, said first named valve means operative thereafter to open said by-pass into the combustion chamber prior to the initiation of a succeeding power stroke.

11. In an internal combustion engine, a power cylinder and a compression cylinder, said compression cylinder having a displacement no greater than that of the power cylinder, a fuel charge by-pass chamber and a combustion chamber arranged in series between the compression cylinder and the power cylinder to conduct successive fuel charges from the compression cylinder to the power cylinder, means to cool said by-pass and remove heat occasioned by compression of fuel charges therein, valve means intermediate the cylinders and chambers to open the combustion chamber to the power cylinder during the power stroke, to open the by-pass chamber to the compression cylinder during the compression stroke, to close said by-pass to the compression cylinder during the exhaust stroke, open and close said combustion chamber to atmosphere during the exhaust stroke, close said combustion chamber with respect to the power cylinder through the major portion of the exhaust stroke and open and close said power cylinder to atmosphere during said exhaust stroke.

12. In an internal combustion engine, a cylinder having only power and exhaust functions and a cylinder having only intake and compression functions, the latter cylinder having a displacement no greater than that of the former, a fuel charge by-pass chamber and a combustion chamber arranged in series between the intake-compression cylinder and the power-exhaust cylinder to conduct successive fuel charges from the compression cylinder to the power cylinder, means to cool said by-pass and remove heat occasioned by compression of fuel charges therein, valve means intermediate the cylinders and chambers to open the combustion chamber to the power cylinder during the entire power stroke, to open the by-pass chamber to the compression cylinder during the compression stroke, to close said by-pass to the compression cylinder during the exhaust stroke and to close said combustion chamber with respect to the power cylinder through the major portion of the exhaust stroke and to thereafter during completion of the exhaust stroke open said by-pass into the combustion chamber to refill same prior to the initiation of the next succeeding power stroke.

13. An internal combustion engine having a crankshaft, a cylinder containing a reciprocating sleeve connected to said crankshaft to move in timed relation therewith, means fixed with respect to sleeve reciprocation to close said cylinder at each end, a piston arranged to reciprocate intermediate said closure means operatively connected to said crankshaft, an intake chamber arranged adjacent said cylinder sleeve, an exhaust chamber arranged adjacent said cylinder sleeve, a by-pass chamber arranged adjacent said cylinder sleeve and said intake chamber, a combustion chamber adjacent said cylinder sleeve and said exhaust chamber, a by-pass conduit extending from said by-pass chamber and terminating in said combustion chamber, means to cool said by-pass and remove heat occasioned by the compression of gases contained therein, a plurality of ports formed in said cylinder sleeve whereby said sleeve reciprocating in response to crankshaft movements successively during a cycle of the engine places certain of said ports in communication with said intake chamber to effect inspiration of a fuel charge upon piston movement in one direction, said sleeve moving further subsequent to said inspiration to admit said inspired gas into said by-pass upon compression of the same upon piston movement in the opposite direction, said sleeve moving further in response to crankshaft rotation to place said by-pass and said combustion chamber in communication with each other and place said exhaust chamber in communication with the interior of said cylinder and thereafter moving further to close the by-pass with respect to the combustion chamber, close the exhaust chamber with respect to the interior of the cylinder, and open the interior of the cylinder to the combustion chamber to permit expanding gases therefrom to effect a power stroke.

14. In an explosion engine, a cylinder, a piston working in said cylinder, a combustion chamber communicating with one end of said cylinder, a port intermediate the combustion chamber and the cylinder, an exhaust port communicating with the cylinder, a pair of ports communicating with the other end of said cylinder, one of said last named ports being adapted to admit gas to said cylinder, the other of said ports being adapted to permit gas to discharge from said cylinder, a by-pass chamber communicating with the second port and with the combustion chamber, a port intermediate the by-pass chamber and the combustion chamber, an exhaust port communicating with the combustion chamber, and means to open and close each of said ports in timed relation to the movement of the piston, the port between the combustion chamber and the cylinder and the port between the cylinder and the by-pass chamber being open during movement of the piston away from the end of the cylinder communicating with the combustion chamber, and being closed during movement of the piston in the opposite direction, and the exhaust ports for the combustion chamber and that end of the cylinder communicating with the combustion chamber, the port between the by-pass chamber and the combustion chamber and the port adapted to admit gas to the cylinder being closed during movement of the piston away from the end of the cylinder communicating with the combustion chamber, and being open during movement of the piston in the opposite direction, all of the ports except the exhaust port leading from the combustion chamber being controlled by a single sleeve reciprocable in said cylinder.

15. The method of obtaining mechanical energy from fuel comprising inspiring a displacement volume of combustible mixture, compressing said inspired mixture to a predetermined pressure, thereafter removing from said compressed mixture the major portion of the heat of compression, thereafter burning a volume of said compressed mixture equal in weight to said inspired displacement volume and adiabatically expanding the burnt mixture against a power piston into a displacement volume at least as great as said inspired displacement volume plus the volume of said compressed mixture burned.

16. In an internal combustion engine, a crank shaft, a cylinder having a piston reciprocable therein and operatively connected to the crankshaft, a constant volume combustion chamber, valve means to open and close said combustion chamber to said cylinder operably connected with said crankshaft to open said chamber to said cylinder near the beginning of each outward stroke of the piston and to close the chamber to the cylinder near the beginning of each inward stroke of the piston, exhaust valve means in said chamber operably connected with said crankshaft to open said chamber to atmosphere before the end of each outward stroke of the piston and while said first named valve means maintains said chamber open to said cylinder, and other exhaust valve means between said cylinder and the atmosphere.

17. In an internal combustion engine, a crankshaft, a cylinder having a piston reciprocable therein and operatively connected to the crankshaft, a constant volume combustion chamber, valve means to open and close said combustion chamber to said cylinder operably connected with said crankshaft to open said chamber to said cylinder near the beginning of each outward stroke of the piston, means to admit a fuel charge to said chamber during each inward stroke of the piston while the chamber is closed to the cylinder, exhaust valve means in said chamber operably connected with said crankshaft to open said chamber to atmosphere before the end of each outward stroke of the piston and while said first named valve means maintains said chamber open to said cylinder, and other valve means between said cylinder and the atmosphere.

18. In an internal combustion engine, a crank shaft, a cylinder having a piston reciprocable therein and operatively connected to the crankshaft, a constant volume combustion chamber, valve means to open and close said combustion chamber to said cylinder operably connected with said crankshaft to open said chamber to said cylinder near the beginning of each outward stroke of the piston and to close the chamber to the cylinder near the beginning of each inward stroke of the piston, exhaust valve means in said chamber operably connected with said crankshaft to open said chamber to atmosphere before the end of each outward stroke of the piston and while said first named valve means maintains said chamber open to said cylinder, and other exhaust valve means operably connected to said crankshaft to open said cylinder directly to atmosphere during each inward stroke of said piston while said chamber is closed to said cylinder.

19. In an internal combustion engine, a crankshaft, a cylinder having a piston reciprocable therein and operatively connected to the crankshaft, a constant volume combustion chamber, valve means to open and close said combustion chamber to said cylinder operably connected with said crankshaft to open said chamber to said cylinder near the beginning of each outward stroke of the piston, means to admit a fuel charge to said chamber during each inward stroke of the piston while the chamber is closed to the cylinder, exhaust valve means in said chamber operably connected with said crankshaft to open said chamber to atmosphere before the end of each outward stroke of the piston and while said first named valve means maintains said chamber open to said cylinder, and other valve means operably connected to said crankshaft to open said cylinder directly to atmosphere during each inward stroke of said piston while said chamber is closed to said cylinder.

20. In an internal combustion engine, a cylinder, a single sleeve valve reciprocably mounted in said cylinder, a piston reciprocable in said sleeve valve, a combustion chamber, a fuel supply duct, a crankshaft operably connected to said piston, means operably connected to said crankshaft and to said sleeve valve to effect one complete reciprocation of said sleeve valve during each revolution of said crankshaft, said sleeve valve having a port arranged to open said combustion chamber to said fuel supply duct during a portion of each inward stroke of the piston, and said cylinder and sleeve valve having ports arranged to open said cylinder to said combustion chamber during each outward stroke of the piston and to open said cylinder to atmosphere during each inward stroke of the piston.

21. In an internal combustion engine, a cylinder, a single sleeve valve reciprocably mounted in said cylinder, a piston reciprocable in said sleeve valve, a combustion chamber, a fuel supply duct, a crankshaft operably connected to said piston, means operably connected to said crankshaft and to said sleeve valve to effect one complete reciprocation of said sleeve valve during each revolution of said crankshaft, said sleeve valve having a port arranged to open said combustion chamber to said fuel supply duct during a portion of each inward stroke of the piston, said cylinder and sleeve valve having ports arranged to open said cylinder to said combustion chamber during each outward stroke of the piston and to open said cylinder to atmosphere during each inward stroke of the piston, said sleeve valve being connected to said crankshaft so as to reach each dead center about one quarter of a revolution after said piston has reached a dead center.

22. In an internal combustion engine, a cylinder closed at its opposite ends, a single sleeve valve reciprocably mounted in said cylinder, a double acting piston reciprocably mounted in said sleeve valve, a crankshaft operably connected to said piston, a fuel supply duct, a bypass, and a combustion chamber, means operably connected to said crankshaft and said sleeve valve to effect one complete reciprocation of said sleeve valve during each revolution of said crankshaft, ports in said sleeve valve and said cylinder arranged to open said cylinder on one side of said piston alternately to said combustion chamber and to the atmosphere, ports in said sleeve valve and said cylinder arranged to open said cylinder on the other side of said piston alternately to said fuel supply duct and to said by-pass, and means to open said combustion chamber to said by-pass once during each revolution of said crankshaft.

23. In an internal combustion engine, a cylinder closed at its opposite ends, a single sleeve valve reciprocably mounted in said cylinder, a double acting piston reciprocably mounted in said sleeve valve, a crankshaft operably connected to said piston, a fuel supply duct, a by-pass, and a combustion chamber, means operably connected to said crankshaft and said sleeve valve to effect one complete reciprocation of said sleeve valve during each revolution of said crankshaft, ports in said sleeve valve and said cylinder arranged to open said cylinder on one side of said piston alternately to said combustion chamber and to the atmosphere, ports in said sleeve valve and said cylinder arranged to open said cylinder on the other side of said piston alternately to said fuel supply duct and to said by-pass, and a port in said sleeve valve arranged to open said by-pass to said combustion chamber once during each revolution of said crankshaft.

24. In an internal combustion engine, a cylinder closed at its opposite ends, a single sleeve valve reciprocably mounted in said cylinder, a double acting piston reciprocably mounted in said sleeve valve, a crankshaft operably connected to said piston, a fuel supply duct, a by-pass, and a combustion chamber, means operably connected to said crankshaft and said sleeve valve to effect one complete reciprocation of said sleeve valve during each revolution of said crankshaft, ports in said sleeve valve and said cylinder arranged to open said cylinder on one side of said piston alternately to said combustion chamber and to the atmosphere, ports in said sleeve valve and said cylinder arranged to open said cylinder on the other side of said piston alternately to said fuel supply duct and to said by-pass, means to open said combustion chamber to said by-pass once during each revolution of said crankshaft, and valve means driven by connections from said crankshaft to open said combustion chamber to atmosphere once during each reciprocation of said piston.

25. In an internal combustion engine, a cylinder closed at its opposite ends, a single sleeve valve reciprocably mounted in said cylinder, a double acting piston reciprocably mounted in said sleeve valve, a crankshaft operably connected to said piston, a fuel supply duct, a by-pass, and a combustion chamber, means operably connected to said crankshaft and said sleeve valve to effect one complete reciprocation of said sleeve valve during each revolution of said crankshaft, ports in said sleeve valve and said cylinder arranged to open said cylinder on one side of said piston alternately to said combustion chamber and to the atmosphere, ports in said sleeve valve and said cylinder arranged to open said cylinder on the other side of said pistons alternately to said fuel supply duct, and to said by-pass, a port in said sleeve valve arranged to open said by-pass to said combustion chamber once during each revolution of said crankshaft, and valve means operably driven by said crankshaft to open said combustion chamber to atmosphere once during each reciprocation of said piston.

26. The method of obtaining mechanical energy from fuel in an internal combustion engine having a cylinder and a reciprocable piston, comprising inspiring a displacement volume of a mixture of fuel and air and compressing the inspired volume into a separate chamber during each reciprocation of the piston, expanding a volume of the compressed mixture from said separate chamber into a combustion chamber, burning the volume in said combustion chamber and expanding the same in said cylinder and against said piston, during each outward stroke thereof, into a volume at least as great as said inspired displacement volume plus the volume of compressed mixture burned, and exhausting the burned gases from the cylinder during each inward stroke of the piston.

27. The method of obtaining mechanical energy from fuel in an internal combustion engine having a cylinder and a reciprocable piston comprising inspiring a displacement volume of a mixture of fuel and air and compressing the inspired volume into a separate chamber during each reciprocation of the piston, cooling the compressed mixture to remove therefrom a substantial portion of the heat of compression, expanding a volume of the compressed mixture from said separate chamber into a combustion chamber, burning the volume in said combustion chamber and expanding the same in said cylinder and against said piston, during each outward stroke thereof, into a volume at least as great as said inspired displacement volume plus the volume of compressed mixture burned, and exhausting the burned gases from the cylinder during each inward stroke of the piston.

28. The method of obtaining mechanical energy from fuel in an internal combustion engine having a cylinder and a double acting piston thereon, comprising inspiring a displacement volume of a mixture of fuel and air on one side of said piston during each inward stroke thereof, compressing the inspired mixture into a separate chamber during each outward stroke of the piston, expanding a volume of the compressed mixture from said separate chamber into a combustion chamber, burning the volume in said combustion chamber and expanding the same into the cylinder on the other side of said piston into a volume at least as great as said displacement volume plus the volume of compressed mixture burned during each outward stroke of the piston and exhausting the burned gases from the cylinder on each inward stroke of the piston.

29. The method of obtaining mechanical energy from fuel in an internal combustion engine having a cylinder and a double acting piston therein, comprising inspiring a displacement volume of a mixture of fuel and air on one side of said piston during each inward stroke thereof, compressing the inspired mixture into a separate chamber during each outward stroke of the piston, cooling the compressed mixture to remove therefrom a substantial portion of the heat of compression, expanding a volume of the compressed mixture from said separate chamber into a combustion chamber, burning the volume in said combustion chamber and expanding the same into the cylinder on the other side of said piston into a volume at least as great as said displacement volume plus the volume of compressed mixture burned during each outward stroke of the piston, and exhausting the burned gases from the cylinder on each inward stroke of the piston.

30. The method of obtaining mechanical energy from fuel in an internal combustion engine having a cylinder and a double acting piston comprising inspiring a mixture of fuel and air and compressing the same into a separate chamber during each reciprocation of the piston, increasing the pressure of the mixture in the separate chamber on successive strokes until such pressure reaches a value which in adiabatic compression would raise the temperature beyond the ignition temperature, cooling the mixture in said separate chamber to maintain the temperature thereof below the ignition temperature, and burning a volume of the compressed cooled mixture and expanding the same against the other side of the piston during each reciprocation of the piston.

31. The method of obtaining energy from fuel in an internal combustion engine comprising compressing an inflammable mixture of gaseous fuel and air to a pressure sufficiently high, if the compression were conducted adiabatically, to cause the temperature of the mixture to reach the ignition point by successively inspiring displacement volumes of the mixture into a compression cylinder, compressing each inspired volume of mixture into a separate chamber, cooling the mixture in the separate chamber, and maintaining said cylinder and chamber in communication throughout each compression stroke and out of communication throughout each inspiration stroke, whereby the compression ratio of each compression stroke is equal to the sum of the volume of the separate chamber and the displacement volume divided by the volume of the separate chamber, and intermittently burning volumes of the compressed cooled mixture and expanding the same in a separate power cylinder to obtain power therefrom.

32. In an internal combustion engine, a power cylinder having a movable piston wall therein, a compression cylinder having a movable piston wall therein, a crankshaft operatively connected to said piston walls to cause reciprocation thereof during rotation of the crankshaft, a fuel supply duct for supplying a mixture of fuel and air, a compression chamber, means to cool gas in the compression chamber, valve means arranged to maintain said compression cylinder closed to said compression chamber and open to said fuel supply duct during each movement of the piston wall in said compression cylinder in one direction to inspire a fuel charge therein, and to maintain said compression cylinder closed to said fuel supply duct and open to said compression chamber throughout each movement of said piston wall in said compression cylinder in the opposite direction to compress the gas in the combined volumes of said compression chamber and compression cylinder into said compression chamber, and means for burning successive separate volumes of the compressed gas from said compression chamber and expanding the same in said power cylinder to move the piston wall therein in one direction.

33. In an internal combustion engine, a compression cylinder having a piston therein, a fuel supply duct to supply an inflammable mixture of fuel and air, valve means connected to be operated in timed relation to the movement of said piston to open said cylinder to said fuel supply duct during movement of said piston in one direction to inspire a fuel charge in said cylinder, a compression chamber of substantial volume with respect to the displacement volume of said cylinder, means to absorb heat of compression from the compressed mixture in said compression chamber means connected to be operated in timed relation to the movement of said piston to open said compression chamber to said cylinder during the movement of said piston in the opposite direction before the pressure in said cylinder reaches the pressure in said compression chamber and remain open throughout the remainder of the movement of said piston in said opposite direction, said valve means being arranged to close communication between said cylinder and said compression chamber during movement of said piston in said one direction, a power cylinder and means to burn successive charges of the compressed mixture from said compression chamber and expand the same in said power cylinder to obtain power therefrom.

34. An internal combustion engine comprising an expansion-exhaust cylinder having a movable piston wall, an inspiration-compression cylinder having a movable piston wall, a crankshaft, means connecting said movable piston walls to said crankshaft, a combustion chamber arranged to communicate with or be separated from said first named cylinder, said second named cylinder having a volume of displacement no greater than that of said first named cylinder, a by-pass arranged to lead fuel charges inspired in said second cylinder to said combustion chamber, valve means driven by said crankshaft in timed relation to the movement of said piston walls arranged to place said by-pass and said second cylinder in communication with each other during the compression stroke of the piston wall in said second cylinder, to thereafter close said by-pass to said second cylinder and place said by-pass and combustion chamber in communication with each other during a portion of the exhaust stroke of said piston wall in said first cylinder, to open said combustion chamber to said first cylinder at the initiation of the expansion stroke of the piston wall therein, and to open said first cylinder to the atmosphere during the exhaust stroke of the piston wall therein, and other valve means to open said combustion chamber to atmosphere while said combustion chamber is in communication with said first cylinder prior to the completion of the expansion stroke of the piston wall in said first cylinder.

35. An internal combustion engine having a crankshaft, a plurality of cylinders and a fuel supply duct, each of said cylinders having a sleeve valve reciprocable therein, means operably connecting said sleeve valves with said crankshaft, means to close each of said cylinders at each end, a piston arranged to reciprocate within each of said sleeve valves intermediate said closure means and operatively connected to said crankshaft, each cylinder having a by-pass and a combustion chamber associated therewith, each cylinder and its associated sleeve valve having ports arranged to open the cylinder on one side of its piston to said fuel supply duct during movement of its piston in one direction to inspire a fuel charge and to close the cylinder to the fuel supply duct during movement of its piston in the opposite direction, ports to open said one side of the cylinder to its associated by-pass throughout movement of its piston in said opposite direction, and means to admit fuel from said by-pass to said combustion chambers.

DANIEL M. WEIGEL.